Dec. 19, 1950     C. C. S. LE CLAIR     2,534,979
LIQUID FLOW METER FOR MEASURING
A PREDETERMINED VOLUME
Filed Oct. 12, 1946     3 Sheets-Sheet 1
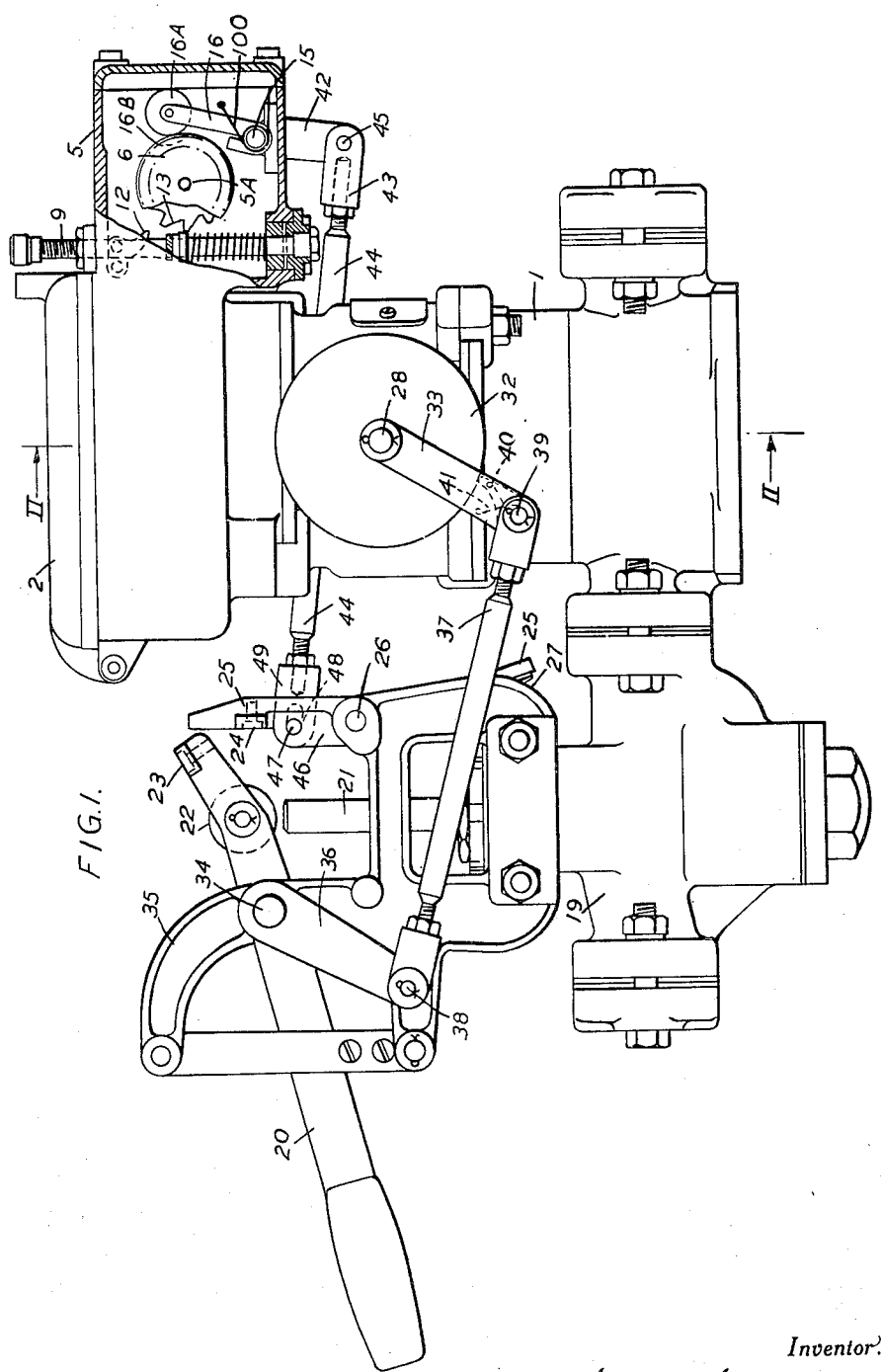
FIG.I.
Inventor:
Camille Clare Sprankling Le Clair
By
Hinkle, Harbert, Ahlberg & Whipper
Attorneys.

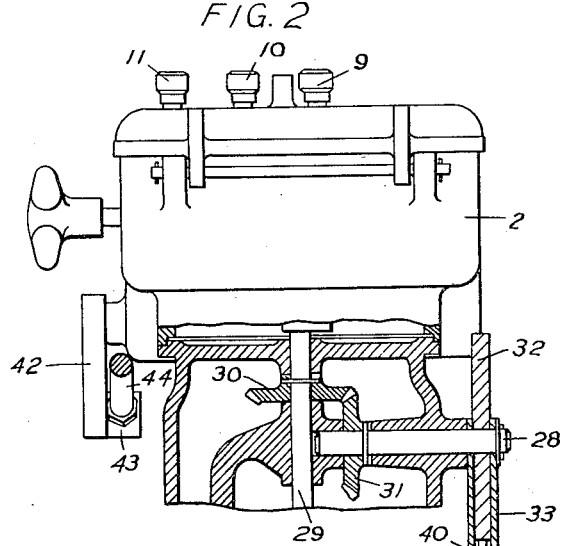
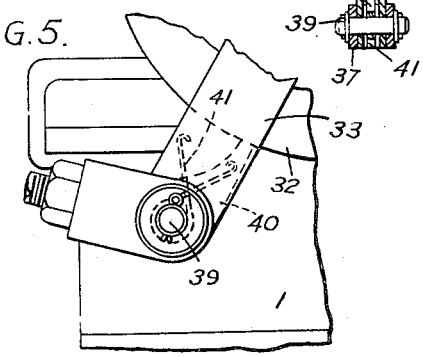
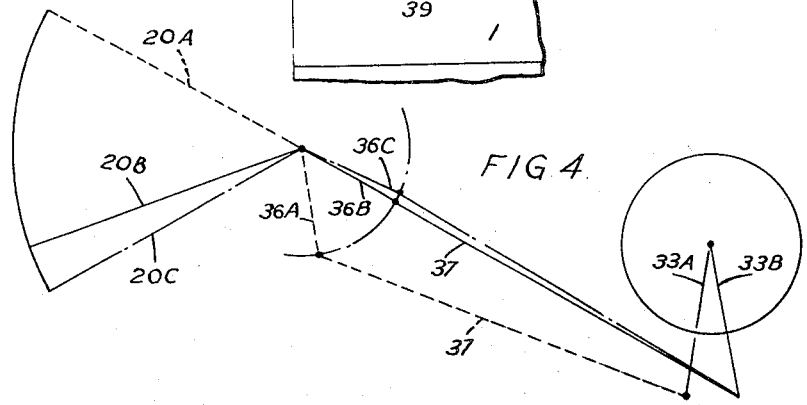

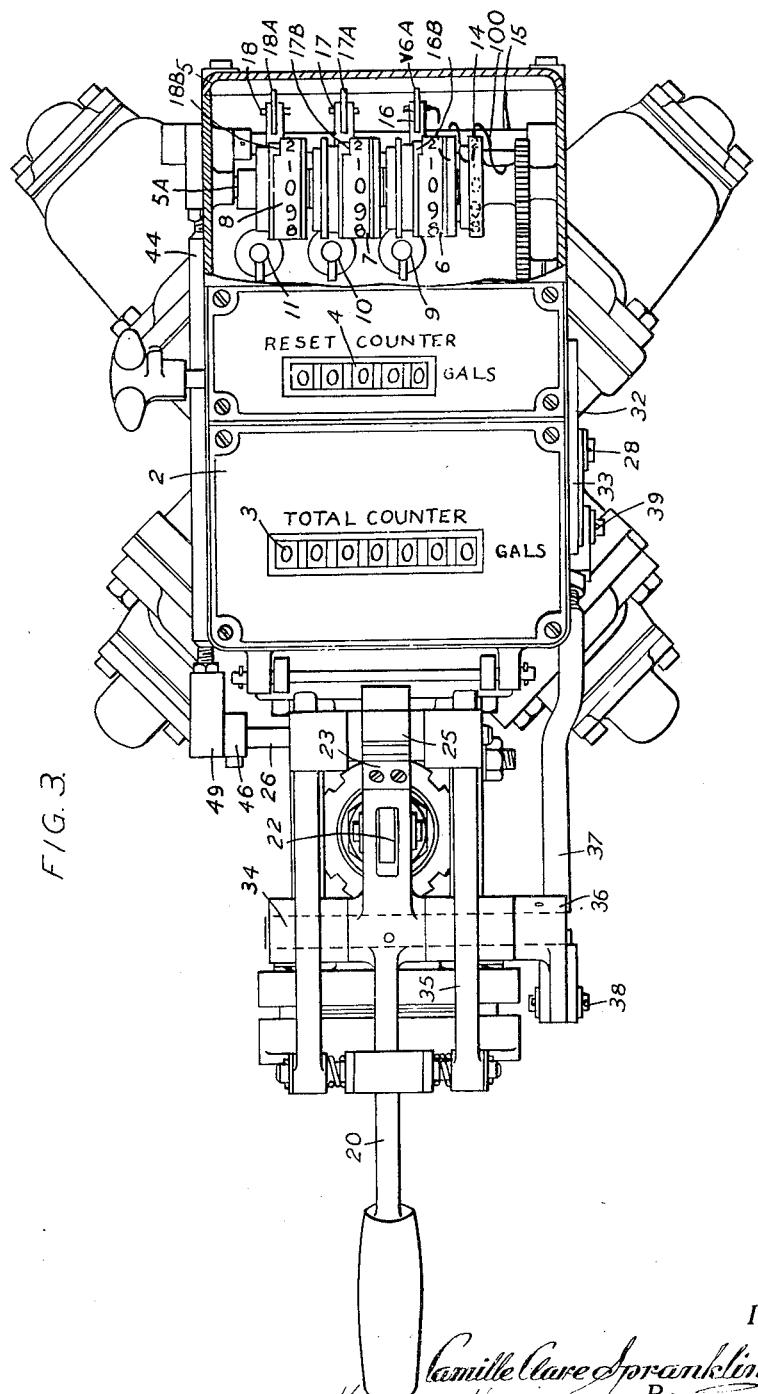

Patented Dec. 19, 1950

2,534,979

UNITED STATES PATENT OFFICE 2,534,979

LIQUID FLOW METER FOR MEASURING A PREDETERMINED VOLUME

Camille Clare Sprankling Le Clair, Acton, London, England, assignor to Tecalemit Limited, Brentford, England, a corporation of Great Britain Application October 12, 1946, Serial No. 703,061
In Great Britain August 24, 1945

8 Claims. (Cl. 222—20)

1

This invention provides improvements in liquid flow meters, of the type which comprise counter mechanism including a number of counter members or drums, some of which can be pre-set to indicate the quantity of liquid that it is desired shall be delivered through the meter from the time the main meter valve is opened until the valve is closed to stop the flow of liquid to the meter.

It will be appreciated that, in meters of this type, in order that the metering may be accurate, it is essential that as soon as the full predetermined quantity of liquid has been delivered the meter valve must shut quickly. This quick closing action, however, causes considerable shock to the apparatus, especially if the pipe connections be long and the flow velocity fairly high. Various methods of overcoming the difficulty have been tried, for example, known meters have been fitted with multiple detent devices, dash-pots and so on, whereby the meter valve may be closed in at least two, and possibly more, stages, its motion during closure being at least partially checked.

By such means the bulk of the liquid required can be metered at the usual speed with the meter valve full open and, when the required quantity is almost complete, the valve is moved toward the closed position until it is only slightly open, the full flow velocity being consequently greatly reduced, and the energy in the fast moving liquid being destroyed by the continued flow of liquid at a transitory elevated pressure through the small valve opening still remaining, the meter valve being finally and quickly closed when the full quantity of liquid has been metered. In these circumstances, because the velocity of flow of the liquid has been previously reduced, the impact caused by the sudden closing of the meter valve is also correspondingly reduced. These devices, however, have the disadvantage of undue complexity.

According to the present invention in or for a liquid flow meter of the type referred to, I provide a single detent device, the action of which is controlled by the counter drum mechanism and which, when in its operative position, acts to hold the meter valve in its fully opened position until a predetermined, definite portion of the total quantity of liquid required to be metered has passed at full flow velocity through the meter, at which point the detent device is released and moves into its inoperative position allowing the valve thereafter to move into its closed position, and control mechanism, operatively connected

2 with the meter mechanism, which, after the release of the detent device, takes over the control of the closing movement of the meter valve allowing the latter to move gradually and precisely into its closed position, as and when a further predetermined definite quantity of the liquid, forming the balance of the total quantity to be metered, has passed through the meter following the release of the detent device. Thus, if the detent device is released when there is still say 0.9 gallon to run before the required pre-set quantity has been delivered and the mechanism is so arranged that it requires the passage of 0.9 of a gallon through the meter to complete the final closure of the valve, then it is obvious that the final closure which is controlled by the said means will take place precisely when the pre-set quantity has been passed.

The control mechanism may comprise a member, or series of members, connected at one end with the valve mechanism controlling the closing movement of the latter, and connected at the other end to the meter mechanism which drives the counter drums, the arrangement being such that the movement of the member or series of members, in the valve-closing direction is entirely controlled by the meter mechanism and hence the closing of the valve is similarly controlled.

The control mechanism may be so arranged that when it takes over the control of the closure of the valve following the release of the detent device, the valve moves slower, or faster, in the initial stages of its closure and faster, or slower, in the later stages, or alternatively such that when the exact total quantity of liquid required has been metered the valve has almost but not quite closed, the meter mechanism loses control of the valve and the latter completes its closure quickly with a snap action.

In one constructional form of the invention which will be more particularly described hereinafter, the control mechanism includes a one-way clutch, the effect of which is to ensure that the mechanism will not overrun, but will move in unison with the meter mechanism. The one-way clutch may comprise a pawl which is carried upon a lever turnably mounted upon a shaft included in the meter mechanism, the pawl being spring-urged into resisting engagement with a disc or wheel which is fixed upon the shaft and thus turns in company with the meter mechanism.

In the same construction, there is also included a hand lever which is adapted to open the meter valve when moved in one direction, the control mechanism being adapted to cooperate with the end of the spindle or equivalent to which the hand lever is attached, so as to allow the valve to close when it is moved in the opposite direction.

One constructional form of the invention is shown, by way of example, on the accompanying drawings, whereon:

Fig. 1 is a side elevation of the meter and valve assembly;

Fig. 2 is a fragmentary section on the line II—II in Fig. 1;

Fig. 3 is a plan view;

Fig. 4 is a diagrammatic view of an alternative design of linkage connecting the meter mechanism to the hand operated meter valve lever; and Fig. 5 is an enlarged view of the one-way clutch forming part of the control mechanism which takes over the closing movement of the valve.

A brief description of known liquid flow meters of the pre-setting type will assist the understanding of the invention. Such meters comprise counter mechanism of known type which is driven from the meter mechanism. The counter drums bear the numerals 0, 1, 2, 3, etc., up to 9 and indicate thousands, hundreds, tens and units and sometimes fractions of a unit and are mounted coaxially on one shaft. The whole counter mechanism is contained within a casing provided with an observation window through which one numeral only on each drum can be read.

The counter drum showing the smallest denomination, which, for the purpose of the present description, may be assumed to be tenths of a gallon and hereinafter referred to as the "fractional drum" is driven directly from the spindle, and subsequent drums showing larger denominations of units, tens, hundreds, etc., are each driven from the adjacent smaller denomination drum by the usual known counter mechanism. The latter comprises an idler wheel which is brought into operation once per revolution of the smaller denomination drum and serves to move the adjacent higher denomination drum one tenth of a revolution, thus exposing the succeeding numeral on the last mentioned drum at the observation window.

In addition to the above mentioned known type of counter mechanisms, means are provided whereby the drums bearing the counter numerals are mounted frictionally upon their driving members in such a way that they may be rotated independently of the driving mechanism, means also being provided whereby this independent rotation may be performed by hand.

A rocking shaft is arranged parallel to the counter drum shaft and to this are fixed a number of swing arms, each fitted with a round nosed pawl adapted to cooperate with a notch in one of the counter drums. When the predetermined quantity of liquid has passed through the meter, all the drums, including the fractional drum, indicate zero, and the arrangement is such that when this occurs the notch in each drum is brought into such a position relative to the pawl which cooperates with it that the swing arms are all able to move inwardly in unison toward the drums. In doing so, they rotate the shaft to which they are fixed through a small angle and thus withdraw a movable detent device cooperating with the meter valve and thereby permit the meter valve to close, which it does under the influence of the pressure of the flowing liquid and/or a spring or springs, and/or a dash pot. As explained previously, if this valve closure is performed quickly it causes shock to the apparatus, whereas if it is done slowly without precise control it is obvious that an error is involved.

To overcome this difficulty therefore, as will appear hereinafter, the known swing arm and pawl associated with the fractional drum is deleted and the remaining mechanism arranged so that as soon as the hundreds, tens, and units drums show zero, their swing arms move inwardly toward the drums, release the detent device and permit the valve to commence to close. The advantage of this invention is that the closing of the valve takes place under the precise and exact influence of the meter mechanism instead of the fortuitous and inexact influence of a spring and/or dash pot.

Referring now to Figs. 1, 2 and 3, the meter 1 is of the known pre-setting type and is surmounted by a box 2 containing the known type of "total" and "reset" counters 3 and 4. The meter also comprises an addendum box 5 containing the pre-settable counter mechanism comprising three numeral drums 6, 7 and 8 showing units, tens and hundreds of gallons, for example, mounted axially upon a single shaft 5A, and three pre-setting plungers 9, 10 and 11 which are urged upwardly by springs and fitted with pawls 12, each of which by cooperation with the teeth 13 upon the numeral drum with which the plunger is associated enables the drum to be preset to the quantity required, as will be explained hereinafter. The apparatus also comprises a fourth drum 14 which is driven directly by the meter mechanism and which rotates one whole revolution per gallon. The drum 14 is not provided with a pre-setting plunger or with numerals or an observation window because pre-setting is only carried out to the nearest whole gallon and readings are not made in fractions. As, however, the drum functions precisely as though it were provided with numerals and an observation window, it is convenient for description purposes to regard it as being so provided. Hence in Fig. 3, numerals are shown in dotted outline on the drum 14.

Within the box 5, parallel to the shaft 5A upon which counter drums are mounted is a second shaft 15 upon which are fixed in axially-spaced relationship three swing arms 16, 17 and 18 respectively fitted with round-nosed pawls 16A, 17A and 18A. In order to reduce friction these pawls are formed as rotatable rollers and they cooperate respectively with semi-circular notches 16B, 17B and 18B in the faces of the numeral drums 6, 7 and 8.

The meter valve is contained in a casing 19. In order to open the valve, the left hand end of a hand operated lever 20 is raised and the valve spindle 21 is thereby depressed to open the valve by contact with it of a roller 22 mounted on the lever 20. When the valve is in its full open position the right hand end 23 of the lever is held by a detent 24. The latter is carried upon a lever 25 fixed to a shaft 26 which is turnably mounted in the frame 35 of the meter valve. The detent is held in its forward or operating position by a spring 27 pressing against the tail end of the lever 25 below the shaft 26.

Referring to Figs. 1, 2 and 3, a transverse shaft 28 is turnably mounted in the upper part of the meter casing and extends sideways out of the casing below the counter box 2. This shaft is driven from the vertical shaft 29 of the meter mechanism by means of a bevel drive 30 and 31 and, consequently, its motion is proportional to the amount of liquid passed through the meter. A disc wheel 32 is fixed on the shaft while a lever 33 is turnably mounted upon the shaft.

The turnable shaft 34 upon which the hand lever 20 is fixed is extended through the side frame 35 of the meter valve and upon the outer end of this shaft is fixed a lever 36. The forked ends of an adjustable tie rod 37 are mounted respectively upon a pin bearing 38 carried by the lever 36 and upon a pin bearing 39 carried by the lever 33. Mounted upon the pin 39 is a pawl 40 the tip of which is arranged at a very steep angle (say 30°) to the peripheral surface of the wheel 32 and held in contact with the wheel by a spring 41, the arrangement being such that the wheel 32 can move counterclockwise relative to the lever 33 and pawl 40, but the lever and pawl cannot move counterclockwise relative to the wheel because of the engagement of the pawl 40 with the periphery of the wheel under the action of the spring 41.

On the opposite side and external to the meter casing, a lever 42 is fixed to the shaft 15 and the right hand end 43 of an adjustable pull rod 44 is mounted upon a pin 45 carried at the lower end of the lever. A lever 46 is fixed to the fulcrum shaft 26 of the detent lever 25 and carries a pin 47 which is engaged in an elongated slot 48 formed in the end 49 of the pull rod 44.

The operation of the meter is as follows:

The required amount of liquid is registered upon the pre-set counter drums 6, 7 and 8 by depressing the plungers 9, 10 and 11 the requisite number of times. By the engagement of the pawl 12 with the teeth 13 of the respective counter drum, each depression rotates the drum one figure 0–1, 1–2, etc. These pre-setting actions have the effect of thrusting the roller pawls 16A, 17A and 18A on the swing arms 16, 17 and 18 backwards out of their notches 16B, 17B and 18B, thereby rotating the shaft 15 through a small angle in the clockwise direction. The lever 42 thus moves in the clockwise direction and thrusts the pull rod 44 to the left. By virtue of the slot 48 in the end 49 of the rod the pin 47 is permitted a limited amount of freedom and hence the detent lever 25, under the action of the spring 27, is permitted (but not forced) to move into its operative position in which the detent 24 moves toward and will ultimately engage the end 23 of the hand lever 20.

The amount of liquid required having been registered on the pre-set counter drums, the meter valve is then opened by raising the hand lever 20, thus depressing the valve spindle 21 by means of the roller 22. During this movement of the hand lever, the end 23 of the lever 20 passes the detent 24, which recedes to permit of its passage, this being rendered possible by the freedom of movement of the pin 47 in the slot 48 of the pull rod 44. As the liquid runs through the meter the wheel 32 turns in the anti-clockwise direction, its periphery sliding under the tip of the pawl 40.

As soon as the hundreds, tens, and units numeral drums 6, 7 and 8 all show zero, which, as will be explained later, occurs when the fractional drum 14 still has to turn through 0.9 gallon, the roller pawls 16A, 17A and 18A on the swing arms 16, 17 and 18 fall forwards in unison into their respective notches 16B, 17B and 18B under the influence of spring means 109 (Figs. 1 and 3). The shaft 15 then rotates in the counterclockwise direction and by means of the lever 42, the pull rod 44 and the lever 46, the detent lever 25 is pulled to the right and the detent 24 is withdrawn from engagement with the end 23 of the hand lever 20.

The meter valve thus freed immediately starts to close but as it does so it compels the hand lever 20, the shaft 34 and the lever 36 all to turn in the counterclockwise direction. The push rod 37 is thrust to the right and the lever 33 is also turned in the counterclockwise direction. As previously explained, the lever 33, cannot overtake the wheel 32 in the counterclockwise direction due to the engagement of the pawl 40 with the periphery of the wheel. Consequently, the rate of rotation of the lever 33 is limited to the rate of rotation of the wheel 32 and thence, the rate at which the meter valve closes depends upon the speed of the meter. As the valve approaches the closed position so the rate of flow through the meter falls and hence the meter speed falls, so that ultimately the valve finally closes with a very slow smooth action entirely without shock.

The present invention, however, permits of considerable latitude to meet any combination of circumstances. Thus, if, as in Fig. 1, the levers 33 and 36 are of the same length and the length of the tie rod 37 is equal to the distance between the centres of the shafts 28 and 34, so that the levers 33 and 36 are parallel, the "gear ratio" between the meter valve and the meter will always be unity or, in other words, the angular motion of the shaft 34 will be equal to that of the meter shaft 28. If, however, the levers are made of different lengths and/or the tie rod is made longer or shorter than the distance between the centres of the shafts 34 and 28 an infinite variety of conditions may be brought about, in which the valve may move slower than the meter in the initial stages and faster later on or vice versa. It may even be arranged that when the exact quantity of liquid has been metered the valve has become very nearly but not quite closed, then at the critical moment the meter loses control of the valve which accordingly snaps shut instantly and securely.

A linkage to secure this result is shown diagrammatically in Fig. 4. When the meter valve is fully open the hand lever 20, occupies the position 20A, the lever 36 takes the position 36A and the meter lever 33 takes the position 33A, all these positions being shown in dotted lines. As soon as the detent 24 is withdrawn and the meter valve starts to close, the lever 20 descends from the position 20A toward the position 20B and the lever 36 moves towards the position 36B, in which the lever 36 and the link 37 are in line or, in other words, the lever 36 acts as a crank on its dead centre all as shown in full lines. It is obvious that in this position the meter no longer exercises any control over the valve which consequently can snap fully shut, the lever 36 occupying some position 36C just over the dead centre, the lever 20 taking a corresponding position 20C as shown in chain dotted lines and the lever 33 remaining substantially unchanged at 33B.

It should be noted that whereas the exact point at which the snap action takes place may not be very exactly defined in terms of movement of the valve lever 36, it is very precisely defined in terms of the movement of the lever 33 and as the latter moves in proportion to the amount of liquid metered, it follows that the final snap action of the valve is precisely defined in terms of liquid metered.

By these variations in design the amount of liquid which passes between the withdrawal of the detent 24 and the final closing of the valve may be varied.

The exact amount of liquid which passes between the release of the detent and the final closing of the valve is immaterial (as long as it does not exceed the amount left on the fractional drum when all the other drums show zero) and does not affect the accuracy of metering so long as it is always the same. This condition is fulfilled because the closing of the valve takes place during a definite angle of the rotation of the wheel 32, which represents a definite quantity of liquid passed.

In modifications, the surface of the wheel 32 and the tip of the pawl 40 may be finely knurled or a roller type of free wheel clutch may be used.

Assuming that a quantity of 845 gallons of liquid is to be measured, that all the pre-setting drums 6, 7 and 8 indicate zero, that the fractional tenths drum 14 is in a position equivalent to zero, that the swings arms 16, 17 and 18 with their pawls are all in their respective notches in the drums and, consequently, the pawl of the detent device 24 is withdrawn from engagement with the end 23 of the meter valve lever 20. In order to register or "pre-set" the amount of liquid required, first of all the units drum 6 is rotated by depressing the plunger 9 five times until the drum shows 5 at the observation window. The first operation, moving the units drum from 0–1 removes the notch 16B in the drum from its position under the pawl 16A and this action consequently forces all the swing arms 16, 17 and 18 backwards and thus causes the rocking shaft 15 to turn backwards through a small angle. This permits the detent 24 to drop back into a position in which it will engage with the rear end 23 of the valve hand lever 20 when required as explained above. As the swing arms 17 and 18 associated with the tens and hundreds drums 7 and 8 are forced backwardly their pawls 17A and 18A are clear of the notches 17B and 18B.

After the units drum has been set to indicate 5 gallons, the tens and hundreds drums are similarly set by the depression of the plungers 10 and 11 to indicate respectively 40 gallons and 800 gallons at the observation window, at which 845.0 can then be read, assuming for the purpose of description that the fractional drum 14 is figured and visible.

The meter valve is now opened by its hand lever 20 and held in the open position by the detent 24.

After one tenth of a gallon has passed, the units numeral is changed from 5–4, and 9 appears on the tenths drum and the counter now reads 844.9. After four and one tenth (4.1) gallons have passed, the units drum shows zero and the tenths drum again shows 9 and, thus, the counter now reads 840.9. As the units drum 6 now shows zero its notch 16B has now been brought opposite to the pawl 16A on its corresponding swing arm 16 but the latter, however, will not fall forward and withdraw the detent 24 because the notches 17B and 18B in the tens and hundreds drums 7 and 8 have not yet been brought opposite their respective pawls 17A and 18A.

This does not occur until 844.1 gallons have passed and then the hundreds, tens and units drums all show zero while the fractional drum shows 9, and the counter thus reads 000.9. When this occurs, the three swing arms 16, 17 and 18 on the shaft 15 are all free to fall forward into their notches and withdraw the detent 24 from engagement with the end 23 of the hand lever of the meter valve.

Thus, while there is still 0.9 gallon to run the meter valve is released and permitted to close. This it does under the exact control of the meter mechanism as described above, the arrangement being such that it reaches its closed position when the said 0.9 gallon has been delivered, so that the total is the exact predetermined quantity of 845.0 and when this occurs the counter reads 000.0.

I claim:

1. In a liquid flow meter having a normally closed main meter valve, means for opening the valve to permit flow of liquid through the meter, counter mechanism pre-settable to indicate the quantity of liquid to be delivered through the meter between the opening of said valve and the closing thereof, means for pre-setting the pre-settable counter mechanism, meter mechanism operated by the flow of liquid through the meter, and means connecting the meter mechanism to the counter mechanism for recording the amount of liquid which flows through the meter, the combination including, mechanism for releasing the meter valve and controlling its closing including an actuating lever for the valve opening means, a single detent device adapted when in its operative position to cooperate with said lever to hold the valve in its full open position, means connecting said detent device to the counter mechanism and adapted to move said detent device into its inoperative position to release said lever and the meter valve opening means whereupon the meter valve commences to move toward its closed position upon the passage at full flow velocity through the meter of a predetermined definite portion of the total quantity of liquid required to be metered, and other control mechanism providing an operative connection between the meter mechanism and the means for opening the meter valve, said last mentioned control mechanism including a member driven by the meter mechanism, a clutch means in engagement with said last mentioned member, and a means connecting said clutch means with said actuating lever, said clutch means preventing movement of said lever to closed position at a rate faster than that governed by said member, so that the valve reaches its closed position after a further predetermined definite quantity of the liquid constituting the balance of the total quantity to be metered has passed through the meter following the release of said detent device.

2. In a liquid flow meter having a normally closed main meter valve, means for opening the valve to permit flow of liquid through the meter, counter mechanism pre-settable to indicate the quantity of liquid to be delivered through the meter between the opening of the valve and the closing thereof, means for pre-setting said pre-settable counter mechanism, meter mechanism operated by the flow of liquid through the meter, and means connecting the meter mechanism to the counter mechanism for recording the amount of liquid which flows through the meter, the combination including, mechanism for releasing the meter valve and controlling its closing including a single detent device adapted when in its operative position to cooperate with the means for opening the meter valve so as to hold the valve in its full open position, means connecting said detent device to the counter mechanism and adapted to move said detent device into its inoperative position to release the meter valve opening means whereupon the meter valve commences to move toward its closed position upon the passage at full flow velocity through the meter of a predetermined definite portion of the total quantity of liquid required to be metered, and other control mechanism providing an operative connection between the meter mechanism and the means for opening the meter valve, said last mentioned control mechanism including a member driven by the meter mechanism, and means including a lost motion means connecting said member with the means for opening the valve, whereby said last mentioned control mechanism is inoperative until said detent device is moved to its inoperative position whereupon movement of said detent to its inoperative position positively connects said member to the valve opening means so that the meter valve is permitted to move at a predetermined rate into its closed position during the passage therethrough of a further predetermined definite quantity of the liquid constituting the balance of the total quantity to be metered.

3. In a liquid flow meter having a normally closed main meter valve, means for opening the valve to permit flow of liquid through the meter, counter mechanism pre-settable to indicate the quantity of liquid to be delivered through the meter between the opening of the valve and the closing thereof, means for pre-setting the pre-settable counter mechanism, meter mechanism operated by the flow of liquid through the meter, and means connecting the meter mechanism to the counter mechanism for recording the amount of liquid which flows through the meter, the combination including, mechanism for releasing the meter valve and controlling its closing including a single detent device adapted when in its operative position to cooperate with the means for opening the meter valve so as to hold the valve in its full open position, means connecting said detent device to the counter mechanism and adapted to move said detent device into its inoperative position to release the meter valve opening means whereupon the meter valve commences to move toward its closed position upon the passage at full flow velocity through the meter of a predetermined definite portion of the total quantity of liquid required to be metered, and other control mechanism providing an operative connection between the meter mechanism and the means for opening the meter valve, said last mentioned control mechanism including a member driven by the meter mechanism, a plurality of interconnected members, one of said members being fixedly connected to the means for opening the meter valve, and another of said members being adapted to be engaged by said meter mechanism driven member, whereupon movement of said detent to its inoperative position causes the means for opening the meter valve to engage said other member with said member driven by the meter mechanism whereby the meter valve is permitted to move at a predetermined rate into its closed position during the passage therethrough of a further predetermined definite quantity of the liquid constituting the balance of the total quantity to be metered.

4. In a liquid flow meter having a normally closed main meter valve, means for opening said valve to permit flow of liquid through the meter, counter mechanism pre-settable to indicate the quantity of liquid to be delivered through the meter between the opening of the valve and the closing thereof, means for pre-setting the pre-settable counter mechanism, meter mechanism operated by the flow of liquid through the meter, and means connecting the meter mechanism to the counter mechanism for recording the amount of liquid which flows through the meter, the combination including mechanism for releasing the meter valve and controlling its closing including a single detent device adapted when it its operative position to cooperate with the means for opening the meter valve so as to hold the valve in its full open position, means connecting said detent device to the counter mechanism and adapted to move said detent device into its inoperative position to release the meter valve opening means whereupon the meter valve commences to move toward its closed position upon the passage at full flow velocity through the meter of a predetermined definite portion of the total quantity of liquid required to be metered, and other control mechanism providing an operative connection between the meter mechanism and the means for opening the meter valve, said last mentioned control mechanism including a rotatable disc driven by the meter mechanism, and means including a clutch adapted to connect said disc with the means for opening the meter valve, said clutch comprising a pawl carried by a lever rotatably mounted concentric with and relative to said disc, and resilient means urging said pawl into engagement with said disc, the arrangement being such that when the meter valve opening means is moved in the valve opening direction the pawl rides over said disc and when the meter valve opening means moves in the valve closing direction the resilient means urges the pawl into engagement with said disc so that the meter valve is permitted to move at a predetermined rate into its closed position during the passage therethrough of a further predetermined definite quantity of the liquid constituting the balance of the total quantity to be metered.

5. In a liquid flow meter having a normally closed main meter valve, means for opening the valve to permit flow of liquid through the meter, counter mechanism pre-settable to indicate the quantity of liquid to be delivered through the meter between the opening of the valve and the closing thereof, means for pre-setting the pre-settable counter mechanism, meter mechanism operated by the flow of liquid through the meter, and means connecting the meter mechanism to the counter mechanism for recording the amount of liquid which flows through the meter, the combination including mechanism for releasing the meter valve and controlling its closing including a pivotally mounted member engageable with the valve opening means and movable in one direction to open the meter valve, a single detent device adapted when in its operative position to cooperate with said pivotally mounted member to hold the valve in its full open position, means connecting said detent device to the counter mechanism and adapted to move said detent device into its inoperative position to release the pivotally mounted member whereupon the meter valve commences to move toward its closed position upon the passage at full flow velocity through the meter of a predetermined definite portion of the total quantity of liquid required to be metered, the movement of the meter valve toward closed position moving said pivotally mounted member in a second direction, and other control mechanism providing an operative connection between the meter mechanism and said pivotally mounted member, said last mentioned control mechanism including a member driven by the meter mechanism, and means including a clutch means in engagement with said last mentioned lever connecting said meter driven member with said pivotally mounted member, the arrangement being such that when said pivotally mounted member is moved in valve opening direction said last named connecting means moves relative to said meter driven member and when said pivotally mounted member moves in valve closing direction said clutch means prevents relative movement between said connecting means and said meter driven member so that the meter valve is permitted to move at a predetermined rate into its closed position during the passage of a further predetermined definite quantity of the liquid constituting the balance of the total quantity to be metered.

6. The combination set forth in claim 5 wherein said pivotally mounted member is a manually actuated lever.

7. The combination set forth in claim 5 wherein said meter driven member is fixedly mounted upon a shaft, and said means connecting said meter driven member with said pivotally mounted member comprises a lever rotatably mounted upon said shaft, a second lever pivotally mounted to rotate with said pivotally mounted member and a tie-rod interconnecting said levers.

8. In a liquid flow meter, the combination of a normally closed main meter valve, means for opening said meter valve to permit flow of fluid through the meter, a counter mechanism presettable to indicate the quantity of liquid to be delivered through the meter between the opening of said valve and the closing thereof, said counter mechanism including a plurality of counter drums having notches formed therein, a rock shaft, a plurality of pawl carrying arms fixedly mounted on said rock shaft and biased toward said drums so that each pawl may engage in one of said notches when said counter drums are aligned to present a predetermined reading, means for pre-setting said pre-settable counter mechanism, meter mechanism operated by the flow of liquid through the meter, means connecting the meter mechanism to said counter mechanism for recording the amount of liquid which flows through the meter, mechanism for releasing said meter valve and controlling its closing including a rocking lever, means connecting said rocking lever with said rock shaft, a single detent device carried by said rocking lever and adapted when in its operative position to cooperate with said means for opening said meter valve so as to hold said valve in its full open position, said detent being movable into its inoperative position after the engagement of said pawls in said notches thereby releasing said valve opening means whereupon the meter valve commences to move toward its closed position upon the passage at full flow velocity through the meter of a predetermined definite portion of the total quantity of liquid to be metered, and other control mechanism providing an operative connection between the meter mechanism and said valve opening means, said last mentioned control mechanism including a member driven by said meter mechanism, and means including a clutch means engageable with said meter driven member connecting said meter driven member with said valve opening means, whereby said last mentioned control mechanism is inoperative until said detent device is moved to its inoperative position whereupon movement of said detent to its inoperative position causes said clutch means to be engaged with said meter driven member so that the meter valve is permitted to move at a predetermined rate into its closed position during the passage therethrough of a further predetermined quantity of liquid constituting the balance of the total quantity to be metered.

CAMILLE CLARE SPRANKLING LE CLAIR.

REFERENCES CITED

The following references are of record in the file of this patent:

UNITED STATES PATENTS

| Number | Name | Date |
|---|---|---|
| 1,948,984 | Granberg | Feb. 27, 1934 |
| 2,012,563 | Hayard | Aug. 27, 1935 |
| 2,039,662 | Roberts | May 15, 1936 |
| 2,052,530 | Handford | Aug. 25, 1936 |